(12) United States Patent
Arndt et al.

(10) Patent No.: US 7,947,781 B2
(45) Date of Patent: May 24, 2011

(54) POLYMER MIXTURE CONSISTING OF AN IMPACT-RESISTANCE MODIFIED POLY (METH) ACRYLATE AND A FLUOROPOLYMER

(75) Inventors: Thomas Arndt, Luetzelbach (DE); Uwe Numrich, Gross-Zimmern (DE); Norbert Deusch, Gundernhausen (DE); Christoph Krohmer, Stockstadt (DE)

(73) Assignee: Evonik Rohm GmbH, Darmstadt (DE)

( * ) Notice: Subject to any disclaimer, the term of this patent is extended or adjusted under 35 U.S.C. 154(b) by 904 days.

(21) Appl. No.: 10/590,932

(22) PCT Filed: May 17, 2005

(86) PCT No.: PCT/EP2005/005381
§ 371 (c)(1),
(2), (4) Date: Aug. 28, 2006

(87) PCT Pub. No.: WO2005/110745
PCT Pub. Date: Nov. 24, 2005

(65) Prior Publication Data
US 2007/0185270 A1     Aug. 9, 2007

(30) Foreign Application Priority Data
May 14, 2004   (DE) .......................... 10 2004 024 429

(51) Int. Cl.
  *C08L 9/00*   (2006.01)
  *C08L 23/00*  (2006.01)
  *C08L 33/04*  (2006.01)
  *C08L 33/18*  (2006.01)

(52) U.S. Cl. ........ 525/191; 525/199; 525/222; 525/232; 525/238; 525/240; 525/241; 428/421; 428/522; 264/211.12

(58) Field of Classification Search .................. 525/191, 525/199, 222, 232, 238, 240, 241; 428/421; 428/522; 264/211.12
See application file for complete search history.

(56) References Cited

U.S. PATENT DOCUMENTS

| 7,179,852 B2 | 2/2007 | Schultes et al. |
| 2003/0031847 A1 | 2/2003 | Numrich et al. |
| 2004/0086721 A1 | 5/2004 | Bonnet et al. |
| 2005/0164007 A1 | 7/2005 | Numrich et al. |
| 2007/0066708 A1 | 3/2007 | Goldacker et al. |
| 2007/0197703 A1 | 8/2007 | Neuhäuser et al. |
| 2008/0281023 A1 | 11/2008 | Numrich et al. |

FOREIGN PATENT DOCUMENTS

| DE | 102 36 045 | | 2/2004 |
| EP | 0 306 385 | B1 | 3/1989 |
| JP | 59-215863 | | 12/1984 |
| JP | 61-008350 | | 1/1986 |
| JP | 64-070549 | | 3/1989 |
| JP | 2002-225184 | | 8/2002 |
| WO | 2004/014634 | | 2/2004 |

OTHER PUBLICATIONS

U.S. Appl. No. 11/816,130, filed Aug. 13, 2007, Numrich, et al.
U.S. Appl. No. 10/570,194, filed Mar. 2, 2006, Numrich, et al.
U.S. Appl. No. 11/721,979, filed Jun. 16, 2007, Goldacker, et al.
U.S. Appl. No. 11/814,704, filed Jul. 25, 2007, Neuhaeuser, et al.
U.S. Appl. No. 11/562,669, filed Nov. 22, 2006, Schultes, et al.
U.S. Appl. No. 12/665,503, filed Dec. 18, 2009, Numrich, et al.
Japanese Office Action issued Nov. 2, 2010, in Japan Application No. 2007-512124.

*Primary Examiner* — Nathan M Nutter
(74) *Attorney, Agent, or Firm* — Oblon, Spivak, McClelland, Maier & Neustadt, L.L.P.

(57) ABSTRACT

The invention relates to a molded body consisting of plastic with a material thickness of at least 150 $g(m)m$ at any point. Said body contains a polymer mixture of an impact-resistance modified poly(meth)acrylate plastic, a polymethyl methacrylate matrix, elastomer particles contained in said matrix and a fluoropolymer. According to the invention, the fraction of the fluoropolymer in the mixture is between 30 and 95 wt. % and the polymer mixture of the impact-resistance modified poly (meth)acrylate plastic and the fluoropolymer is present in an outer layer with a continuous material thickness of at least 10 $g(m)m$. The invention is characterized in that the impact-resistance modified poly(meth)acrylate plastic consists of between 20 and 70 wt. % poly(meth)acrylate matrix and between 30 and 80 wt. % elastomer particles.

13 Claims, No Drawings

POLYMER MIXTURE CONSISTING OF AN IMPACT-RESISTANCE MODIFIED POLY (METH) ACRYLATE AND A FLUOROPOLYMER

The invention relates to a polymer mixture composed of an impact-modified poly(meth)acrylate polymer and a fluoropolymer. The invention further relates to a film produced from the polymer mixture, to a process for its production and to its use as a surface protection film.

STATE OF THE ART

EP 0 476 942 describes a polymer mixture composed of an impact-modified poly(meth)acrylate polymer and a fluoropolymer, its content in the mixture being from 3 to 12% by weight. The polymer mixtures can be used to produce surface protection films for polyvinyl chloride or acrylonitrile-butadiene-styrene (ABS) plastic parts. This allows their weathering resistance to be improved.

JP-B 03 124754 A2 describes films which are produced from impact-modified poly(meth)acrylate and fluoropolymers, the fraction of the fluoropolymers being from 5 to 25% by weight.

WO 00/37237 describes a process for producing films which comprise fluoropolymers and poly(meth)acrylates in at least one layer. For extrusion, a mixture is used which comprises from 10 to 90% by weight of PVDF and from 90 to 10% by weight of polymethyl methacrylate, based on the weight of the overall mixture.

DE 102 36 045 A1 describes an extrusion process for producing low-orientation thermoplastic films with a thickness range from 20 to 1000 µm. Suitable materials listed for the films also include polymer mixtures composed of an impact-modified poly(meth)acrylate polymer and a fluoropolymer, their mixing ratio being from 10:90 to 90:10. A multitude of possible uses for the films are mentioned, for example use as decorative films, UV protection films, dry coating films, scratch protection films for optical data carriers, and also data carrier materials which are printed by means of continuous printing processes such as gravure printing, flexographic printing, offset printing, digital printing, roller screenprinting, transfer printing processes, and/or are processed in continuous lamination processes such as film colamination, lamination of thermoplastic sheet and profile materials, sheathing techniques, coil-coating processes and/or continuous coating processes such as water-spreading coating, antibacterial coating, self-cleaning coating, antigraffiti coating, scratch-resistant coating, electrically conductive coating, optionally combined with embossing processes. As a guide value for the thickness of laminate films, 100 µm is specified.

EP 1 093 911 A2 describes impact-resistant multilayer protective films composed of an exposed layer comprising a mixture of a fluoropolymer and an acrylic polymer and a layer below it which may consist, for example, of impact-modified poly(meth)acrylate.

EP 0 306 385 A1 describes impact-resistant polymer mixtures. These may consist of of an impact-modified poly(meth) acrylate polymer and a fluoropolymer. The proportion of the fluoropolymer is below 30% by weight. For the elastomer particles, a wide size range of from 40 to 500 nm is specified.

JP 59127754 A2 and JP 59127755 A2 describe weathering-resistant protective films for PVC-steel composites. The protective films consist of fluoropolymers which have an acrylate elastomer content but no (meth)acrylate matrix.

PROBLEM AND SOLUTION

Individual films and composite films of the prior art, especially those which consist of fluoropolymers in a mixture with impact-modified poly(meth)acrylates, have excellent properties. Mention should be made in particular of high weathering resistance, good chemical resistance, high resistance toward stress corrosion cracking and good mechanical strength. They are therefore predestined for external use. However, it has been found that virtually all of these films, whether as individual films or composite films, especially in the case of external applications and simultaneous thermal stress occurring for a prolonged period, react to a greater or lesser degree with undesired embrittlement when the film or the composite has a material thickness of at least 150, 200, 250 µm or more. This restricts the possible uses of the films, for example in relatively warm geographical regions or generally in applications, especially external applications in a hot environment.

The object was therefore considered to be that of providing a material or a molding from which individual films and composite films with a material thickness of at least 150 µm or higher can be produced, which exhibit very low embrittlement, if any, after prolonged thermal stress.

The object is achieved by a molding made of plastic and having a material thickness of at least 150 µm, comprising a polymer mixture composed of an impact-modified poly (meth)acrylate polymer, of a poly(meth)acrylate matrix and elastomer particles distributed therein, and a fluoropolymer, the proportion of the fluoropolymer in the mixture being from 30 to 95% by weight, and the polymer mixture composed of the impact-modified poly(meth)acrylate polymer and the fluoropolymer being present in an outer layer with a continuous material thickness of at least 10 µm, characterized in that the impact-modified poly(meth)acrylate polymer consists of from 20 to 70% by weight of a poly(meth)acrylate matrix and from 80 to 30% by weight of elastomer particles.

The invention is based on the finding that polymer mixtures composed of an impact-modified poly(meth)acrylate polymer, of a poly(meth)acrylate matrix and elastomer particles distributed therein, and a fluoropolymer, from a material thickness of about at least 150 µm, in particular at least 200 µm or at least 250 µm, tend to increased long-term embrittlement compared to thinner parts. The increased long-term embrittlement tendency is manifested irrespective of whether the moldings consist entirely of the polymer mixture or whether they are composite moldings in which the polymer mixture composed of the impact-modified poly(meth)acrylate polymer and the fluoropolymer is present in an outer layer with a continuous material thickness of at least 10 µm. The increased long-term embrittlement is a problem in exposed individual films which are intended for use, for example, as a roofing element, and also in the case of composite films, for example automobile exterior parts which are provided with a protective film composed of the polymer mixture. Depending on their nature and exposure, the parts may become unsightly after a few months or a few years. There is therefore a need to reduce the tendency to long-term embrittlement in such parts or moldings.

The increased long-term embrittlement tendency, for example in the case of films which consist entirely of the polymer mixture, is associated experimentally with a decline in the elongation at break after storage at 60° C. for 10 days to significantly below 50% of the value without 10-day thermal stress. This experimental correlation is not found in the case of thin films of material strength below 150 µm or below 100 µm. Here, virtually no relevant decline in the elongation at break occurs after storage at 60° C. for 10 days. In spite of this, the effect of the long-term embrittlement tendency also occurs in the case of composite moldings in which the polymer mixture mentioned is present in an outer layer with a continuous material thickness of at least 10 µm.

The theory has been developed that parts or moldings having a material thickness of about at least 150 µm which consist entirely of a polymer mixture composed of an impact-modified poly(meth)acrylate polymer and a fluoropolymer, in the course of external weathering or else experimentally in the course of storage at 60° C. for 10 days, have an increased tendency in practice after thermal stress to premature failure in the event of mechanical stress owing to the hindrance of cross-contraction in their material as a result of the material thickness. In the case of composite moldings in which the polymer mixture mentioned is present in an outer layer with a continuous material thickness of at least 10 µm, this effect occurs in a similar manner, because the firm binding to the substrate here hinders the cross-contraction of the polymer mixture in the outer layer in a similar manner. In the case of an individual thin molding, for example of a film, this effect occurs neither in practice nor experimentally in the course of storage at 60° C. for 10 days. On the basis of this finding, the problem to be solved relates uniformly to moldings made of plastic having a material thickness of at least 150 µm, comprising a polymer mixture composed of an impact-modified poly(meth)acrylate polymer and a fluoropolymer in an outer layer with a continuous material thickness of at least 10 µm, irrespective of whether the molding consists entirely of the polymer mixture or it is a composite molding with a thin outer layer composed of the polymer mixture.

The solution to the problem relates to a selection of the mixing ratio of the polymer mixture composed of the impact-modified poly(meth)acrylate polymer and the fluoropolymer, the proportion of the fluoropolymer in the mixture being from 30 to 95% by weight. Moreover, the impact-modified poly(meth)acrylate polymer must consist of from 20 to 70% by weight of a poly(meth)acrylate matrix and from 30 to 80% by weight of elastomer particles.

In particular embodiments, these elastomer particles have a mean particle diameter of from 10 to 1000 nm, of from 20 to 600 nm, of from 30 to 500 nm or of from 50 to 150 nm.

The measures as a whole ensure that parts having a material thickness of at least 150 µm and consisting entirely of the polymer mixture have a sufficient elongation at break after storage at 60° C. for 10 days of at least 150%. In this case, the elongation at break after storage at 60° C. for 10 days is still at least 60% of the value without 10-day thermal stress.

These measures also apply to composite parts with a material thickness of at least 150 µm, in which the polymer mixture composed of the impact-modified poly(meth)acrylate polymer and the fluoropolymer is present in an outer layer with a continuous material thickness of at least 10 µm. However, the experimental testing of the suitability here is not effected by measuring the elongation at break after storage at 60° C. for 10 days but rather by measuring the elongation on commencement of crack formation in the outer layer after storing the composite part at 60° C. for 10 days. This value should be at least 50% of the value without 10-active storage at 60° C. The starting value without storage at 60° C. for 10 days is at least 100% for composite parts.

PERFORMANCE OF THE INVENTION

The Polymer Mixture

The polymer mixture composed of an impact-modified poly(meth)acrylate polymer and a fluoropolymer, characterized in that the proportion of the fluoropolymer in the mixture is from 30 to 95%, preferably from 40 to 80%, in particular from 50 to 70% by weight.

Impact-modified Poly(meth)acrylate Polymer

The impact-modified poly(meth)acrylate polymer consists of from 20 to 7.0%, preferably from 25 to 60% by weight and more preferably from 30 to 50% by weight of a poly(meth)acrylate matrix, and from 80 to 30%, preferably from 75 to 40% by weight and more preferably from 70 to 50% by weight of elastomer particles.

In particular embodiments, the mean particle diameter of the elastomer particles is from 10 to 1000 nm, from 20 to 600 nm, from 30 to 500 nm or from 50 to 150 nm (measurement, for example, by the ultracentrifuge method).

The elastomer particles distributed in the poly(meth)acrylate matrix preferably have a core with a soft elastomer phase and a hard phase bonded thereto.

The impact-modified poly(meth)acrylate polymer (imPMMA) consists of a fraction of matrix polymer polymerized from at least 80% by weight of units of methyl methacrylate and optionally from 0 to 20% by weight of units of monomers copolymerizable with methyl methacrylate, and a fraction of impact-modifiers based on crosslinked poly(meth)acrylates distributed in the matrix.

The matrix polymer consists in particular of from 80 to 100%, preferably 90-99.5% by weight, of free-radically polymerized methyl methacrylate units and optionally 0-20%, preferably 0.5-10% by weight of further free-radically polymerizable comonomers, for example $C_1$- to $C_4$-alkyl (meth)acrylates, in particular methyl acrylate, ethyl acrylate or butyl acrylate. The mean molecular weight $M_W$ (weight-average) of the matrix is preferably in the range from 90 000 g/mol to 200 000 g/mol, in particular from 100 000 g/mol to 150 000 g/mol (determination of $M_W$ by means of gel permeation chromatography with reference to polymethyl methacrylate as the calibration standard). The molecular weight $M_W$ can be determined, for example, by gel permeation chromatography or by the scattered light method (see, for example, H. F. Mark et al., Encyclopedia of Polymer Science and Engineering, 2nd Edition, Vol. 10, pages 1 ff., J. Wiley, 1989).

Preference is given to a copolymer composed of from 90 to 99.5% by weight of methyl methacrylate and from 0.5 to 10% by weight of methyl acrylate. The Vicat softening temperatures VET (ISO 306-B50) may be in the range from at least 90, preferably from 95 to 112° C.

The Impact Modifier

The polymethacrylate matrix comprises an impact modifier which may, for example, be an impact modifier having a two- or three-shell structure.

Impact modifiers for polymethacrylate polymers are sufficiently well known. Preparation and structure of impact-modified polymethacrylate molding materials are described, for example, in EP-A 0 113 924, EP-A 0 522 351, EP-A 0 465 049 and EP-A 0 683 028.

Impact Modifiers

The impact modifier is prepared in a manner known per se by bead polymerization or by emulsion polymerization, and the crosslinked particles thus obtained may have a mean particle size in the range from 10 to 1000 nm, from 20 to 600 nm, from 30 to 500 nm or from 50 to 150 nm.

These particles consist generally of at least 40%, preferably 50-70% by weight of methyl methacrylate, from 20 to 40%, preferably from 25 to 35% by weight of butyl acrylate, and from 0.1 to 2%, preferably from 0.5 to 1% by weight of a crosslinking monomer, for example a polyfunctional (meth) acrylate, for example allyl methacrylate, and optionally further monomers, for example from 0 to 10%, preferably from 0.5 to 5% by weight of $C_1$-$C_4$-alkyl methacrylates such as ethyl acrylate or butyl methacrylate, preferably methyl acrylate, or other vinylically polymerizable monomers, for example styrene.

Preferred impact modifiers are polymer particles which may have a two- or a three-layer core-shell structure and are obtained by emulsion polymerization (see, for example, EP-A 0 113 924, EP-A 0 522 351, EP-A 0 465 049 and EP-A 0 683 028). Suitable particle sizes of these emulsion polymers are, for example, in the range of 10-150 nm, preferably from 20 to 120 nm, more preferably 50-100 nm.

A three-layer or three-phase structure with one core and two shells may have the following properties. An innermost (hard) shell may consist, for example, essentially of methyl methacrylate, small fractions of comonomers, for example ethyl acrylate, and a crosslinker fraction, for example allyl methacrylate. The middle (soft) shell may be composed, for example, of butyl acrylate and optionally styrene, while the outermost (hard) shell essentially usually corresponds to the matrix polymer, which brings about the compatibility and good binding to the matrix. The polybutyl acrylate fraction in the impact modifier is crucial for the impact-modifying action and is preferably in the range from 20 to 40% by weight, more preferably in the range from 25 to 35% by weight.

Impact-modified Polymethacrylate Molding Materials

In the extruder, the impact modifier and matrix polymer may be mixed in the melt to give impact-modified polymethacrylate molding materials. The discharged material is generally first cut into granules. These can be further processed by means of extrusion or injection molding to give moldings such as films, profiles, sheets or injection-molded parts.

Two-phase Impact Modifier According to EP 0 528 196 A1

Preferably, especially for film production, but not restricted thereto, a system known in principle from EP 0 528 196 A1 is used, which is a biphasic, impact-modified polymer composed of:
  a1) from 10 to 95% by weight of a continuous hard phase with a glass transition temperature $T_{mg}$ above 70° C., composed of
    a11) from 80 to 100% by weight (based on a1) of methyl methacrylate and
    a12) from 0 to 20% by weight of one or more further ethylenically unsaturated, free-radically polymerizable monomers, and
  a2) from 90 to 5% by weight of a tough phase with a glass transition temperature $T_{mg}$ below -10° C. distributed in the hard phase, and composed of
    a21) from 50 to 99.5% by weight of a $C_1$-$C_{10}$-alkyl acrylate (based on a2),
    a22) from 0.5 to 5% by weight of a crosslinking monomer having two or more ethylenically unsaturated, free-radically polymerizable radicals, and
    a23) optionally further ethylenically unsaturated, free-radically polymerizable monomers,
at least 15% by weight of the hard phase a1) being bonded covalently to the tough phase a2).

The biphasic impact modifier can be obtained by a two-stage emulsion polymerization in water, as described, for example, in DE-A 38 42 796. In the first stage, the tough phase a2) is obtained and is composed of lower alkyl acrylates to an extent of at least 50% by weight, preferably to an extent of more than 80% by weight, which gives rise to a glass transition temperature $T_{mg}$ of this phase of below -10° C. The crosslinking monomers a22) used are (meth)acrylic esters of diols, for example ethylene glycol dimethacrylate or 1,4-butanediol methacrylate, aromatic compounds having two vinyl or allyl groups, for example divinylbenzene, or other crosslinkers having two ethylenically unsaturated, free-radically polymerizable radicals, for example allyl methacrylate as a graft crosslinker. Examples of crosslinkers having three or more unsaturated, free-radically polymerizable groups, such as allyl groups or (meth)acryloyl groups, include triallyl cyanurate, trimethylolpropane triacrylate and trimethacrylate, and pentaerythrityl tetraacrylate and tetramethacrylate. Further examples for this purpose are given in U.S. Pat. No. 4,513,118.

The ethylenically unsaturated, free-radically polymerizable monomers specified under a23) may, for example, be acrylic or methacrylic acid and their alkyl esters having 1-20 carbon atoms, provided that they have not yet been mentioned, where the alkyl radical may be linear, branched or cyclic. In addition, a23) may comprise further free-radically polymerizable aliphatic comonomers which are copolymerizable with the alkyl acrylates a21). However, significant fractions of aromatic comonomers such as styrene, alpha-methyl-styrene or vinyltoluene should remain excluded, since they lead to undesired properties of the molding material A, in particular in the event of weathering.

In obtaining the tough phase in the first stage, the particle size and its polydispersity must be set precisely. The particle size of the tough phase depends essentially on the concentration of the emulsifier. Advantageously, the particle size can be controlled by the use of a seed latex. Particles having a mean particle size (weight-average) below 130 nm, preferably below 70 nm, and having a polydispersity $U_{80}$ below 0.5 ($U_{80}$ is calculated from an integral treatment of the particle size distribution which is determined by ultracentrifuge. $U_{80} = [(r_{90}-r_{10})/r_{50}] - 1$, where $r_{10}$, $r_{50}$, $r_{90}$ = mean integral particle radius for which 10, 50, 90% of the particle radii are below and 90, 50, 10% of the particle radii are above this value) preferably below 0.2, are achieved with emulsifier concentrations of from 0.15 to 1.0% by weight based on the water phase. This is the case in particular for anionic emulsifiers, for example the particularly preferred alkoxylated and sulfated paraffins. The polymerization initiators used are, for example, from 0.01 to 0.5% by weight of alkali metal peroxodisulfate or ammonium peroxodisulfate, based on the water phase, the polymerization is triggered at temperatures of from 20 to 100° C. Preference is given to using redox systems, for example a combination of from 0.01 to 0.05% by weight of organic hydroperoxide and from 0.05 to 0.15% by weight of sodium hydroxymethylsulfinate, at temperatures of from 20 to 80° C.

The hard phase a1) bonded covalently to the tough phase a2) at least to an extent of 15% by weight has a glass transition temperature of at least 70° C. and may be composed exclusively of methyl methacrylate. As comonomers a12), up to 20% by weight of one or more further ethylenically unsaturated, free-radically polymerizable monomers may be present in the hard phase, and alkyl (meth)acrylates, preferably alkyl acrylates having 1 to 4 carbon atoms, are used in such amounts that the glass transition temperature does not go below that mentioned above.

The polymerization of the hard phase a1) proceeds, in a second stage, likewise in emulsion using the customary assistants, as are also used, for example, for the polymerization of the tough phase a2).

In a preferred embodiment, the hard phase comprises low molecular weight and/or copolymerized UV absorbers in amounts of from 0.1 to 10% by weight, preferably from 0.5 to 5% by weight, based on A as a constituent of the comonomeric components a12) in the hard phase. Examples of polymerizable UV absorbers, as described, inter alia, in U.S. Pat. No. 4,576,870, include 2-(2'-hydroxyphenyl)-5-methacryloylamidobenzotriazole or 2-hydroxy-4-methacryloyloxybenzophenone. Low molecular weight UV absorbers may, for example, be derivatives of 2-hydroxybenzophenone or of 2-hydroxybenzotriazole or phenyl salicylate. In general, the low molecular weight UV absorbers have a molecular weight of less than $2 \times 10^3$ (g/mol). Particular preference is given to UV absorbers with low volatility at the processing temperature and homogeneous miscibility with the hard phase a1) of the polymer A.

Light Stabilizers

Light stabilizers shall be understood to mean UV absorbers, UV stabilizers and free-radical scavengers.

Optionally present UV stabilizers are, for example, derivatives of benzophenone whose substituents, such as hydroxyl and/or alkoxy groups, are usually in the 2-and/or 4-position. These include 2-hydroxy-4-n-octoxy-benzophenone, 2,4-dihydroxybenzophenone, 2,2'dihydroxy-4-methoxybenzophenone, 2,2',4,4'-tetrahydroxybenzo-phenone, 2,2'-dihydroxy-4,4'-dimethoxybenzophenone, 2-hydroxy-4-methoxybenzophenone. In addition, substituted benzotriazoles are very suitable as a UV protection additive, which include in particular 2-(2-hydroxy-5-methylphenyl)benzotriazole, 2-[2-hydroxy-3,5-di(alpha,alpha-dimethylbenzyl)phenyl]benzotriazole, 2-(2-hydroxy-3,5-di-t-butylphenyl)benzotriazole, 2-(2-hydroxy-3,5-butyl-5-methylphenyl)-5-chlorobenzo-triazole, 2-(2-hydroxy-3,5-di-t-butylphenyl)-5-chloro-benzotriazole, 2-(2-hydroxy-3,5-di-t-amylphenyl)benzo-triazole, 2-(2-hydroxy-5-t-butylphenyl)benzotriazole, 2-(2-hydroxy-3-sec-butyl-5-t-butylphenyl)benzotriazole and 2-(2-hydroxy-5-t-octylphenyl)benzotriazole, phenol, 2,2'-methylenebis[6-(2H-benzotriazol-2-yl)-4-(1,1,3,3-tetramethylbutyl)].

In addition to the benzotriazoles, it is also possible to use a UV absorber from the class of the 2-(2'-hydroxyphenyl)-1,3,5-triazines, for example phenol, 2-(4,6-diphenyl-1,2,5-triazin-2-xy)-5-(hexyloxy).

Further usable UV stabilizers are ethyl 2-cyano-3,3-diphenylacrylate, 2-ethoxy-2'-ethyloxalic bisanilide, 2-ethoxy-5-t-butyl-2'-ethyloxalic bisanilide and substituted phenyl benzoates.

The light stabilizers or UV stabilizers may be present in the polymethacrylate compositions to be stabilized as low molecular weight compounds as specified above. However, it is also possible for UV-absorbing groups to be bonded into the matrix polymer molecules covalently after copolymerization with polymerizable UV absorption compounds, for example acryloyl, methacryloyl or allyl derivatives of benzophenone derivatives or benzo-triazole derivatives. The proportion of UV stabilizers, which may also be mixtures of chemically different UV stabilizers, is generally from 0.01 to 10% by weight, in particular from 0.01 to 5% by weight, especially from 0.02 to 2% by weight, based on the (meth) acrylate copolymer of layer a).

As an example of free-radical scavengers/UV stabilizers, mention should be made here of sterically hindered amines which are known under the name HALS (Hindered Amine Light Stabilizers). They can be used for the inhibition of aging processes in coatings and plastics, in particular in polyolefin polymers (Kunststoffe, 74 (1984) 10, p. 620 to 623; Farbe+Lack, Volume 96, 9/1990, p. 689-693). The tetramethyl-piperidine group present in the HALS compounds is responsible for their stabilizing action. This compound class may be either unsubstituted or alkyl- or acyl-substituted on the piperidine nitrogen. The sterically hindered amines do not absorb in the UV region. They scavenge free radicals formed, which the UV absorbers in turn cannot do.

Examples of stabilizing HALS compounds which can also be used as mixtures are:

bis(2,2,6,6-tetramethyl-4-piperidyl) sebacate, 8-acetyl-3-dodecyl-7,7,9,9-tetramethyl-1,3,8-triaza-spiro[4.5]decane-2,5-dione, bis(2,2,6,6-tetramethyl-4-piperidyl) succinate, poly(N-β-hydroxyethyl-2,2,6,6-tetramethyl-4-hydroxypiperidinesuccinic ester) or bis(N-methyl-2,2,6,6-tetramethyl-4-piperidyl) sebacate.

Fluoropolymers

In the context of the present invention, fluoropolymers are understood to mean polymers which can be obtained by free-radical polymerization of olefinically unsaturated monomers on whose double bond at least one fluorine substituent is present. This also includes copolymers. These copolymers may, in addition to one or more fluorine-containing monomers, contain further monomers which are copolymerizable with these fluorine-containing monomers. The preferred fluoropolymer is polyvinylidene fluoride (PVDF).

The fluorine-containing monomers include chlorotrifluoroethylene, fluorovinylsulfonic acid, hexafluoroisobutylene, hexafluoropropylene, perfluorovinyl methyl ether, tetrafluoroethylene, vinyl fluoride and vinylidene fluoride. Among these, vinylidene fluoride is particularly preferred.

It is important for the present invention that the fluorine-containing polymer can be extruded to films. Accordingly, the molecular weight may vary within wide ranges if assistants or copolymers are used. In general, the weight-average molecular weight of the fluorine-containing polymers is within the range from 100 000 to 200 000, preferably within the range from 110 000 to 170 000, without any intention that this should impose a restriction.

Moldings a) Molding Which Consists Entirely of the Polymer Mixture

The inventive molding may, in relation to its polymeric composition, consist entirely of the polymer mixture composed of the impact-modified poly(meth)acrylate polymer and the fluoropolymer. In general, in a manner known per se, customary additives, assistants and/or fillers are also present, for example thermal stabilizers, UV stabilizers, UV absorbers, antioxidants and/or colorants, pigments or organic dyes. Preferably not more than 10%, more preferably not more than 5%, in particular not more than 2% by weight of customary additives, assistants and/or fillers are present. If appropriate, the molding may also comprise no additives, assistants and/or fillers at all. Comprise.

The inventive molding may, for example, be a film with a film thickness of from 150 to 2000 μm, preferably from 200 to 1000 μm, more preferably from 300 to 500 μm.

The inventive film may have an elongation at break without storage at 60° C. for 10 days of at least 250%, preferably at least 280%, in particular at least 300%.

The inventive film may have an elongation at break after storage at 60° C. for 10 days of at least 150%, preferably at least 175%, in particular 200%.

The inventive film may have an elongation at break after storage at 60° C. for 10 days which is still at least 60%, preferably at least 70%, in particular at least 80% of the value without 10-day thermal stress. The film may, for example, be present within a membrane structure, the membrane structure comprising at least two curved films welded to one another at the edges and enclosing a cavity. Such membranes are known from buildings such as the well-known Eden Project.

The inventive moldings or the film can be produced in a manner known per se by means of thermoplastic processing, especially extrusion or injection molding.

The inventive molding or the film may, for example, be used as a roofing element, facade element, as a window in a folding roof for a vehicle with foldable soft top.

b) Composite Molding

The inventive molding may be a composite molding which, in addition to the layer comprising the polymer mixture composed of the impact-modified poly(meth)acrylate polymer and the fluoropolymer, comprises a further thermoplastically processible polymer bonded to the polymer mixture and the layer of the polymer mixture has a continuous material thickness of from 10 to 100 µm, preferably from 20 to 80 µm.

In general, the layer comprising the polymer mixture and optionally also the further polymer below it also comprise, in a manner known per se, customary additives, assistants and/or fillers, for example thermal stabilizers, UV stabilizers, UV absorbers, antioxidants and/or colorants, pigments or organic dyes. Preferably not more than 10%, more preferably not more than 5%, in particular not more than 2% by weight of customary additives, assistants and/or fillers are present. If appropriate, the polymers may also not comprise any additives, assistants and/or fillers at all. Comprise. The layer of the polymer mixture composed of the impact-modified poly(meth)acrylate polymer and the fluoropolymer more preferably comprises from 0.01 to 10% by weight of a light stabilizer.

The further polymer present in the composite molding may be a polymethyl methacrylate, impact-modified polymethyl methacrylate, polycarbonate, polystyrene, acrylic ester/styrene/acrylonitrile graft copolymer (ASA), styrene-acrylonitrile (SAN), polyethylene terephthalate (PET), glycol-modified polyethylene terephthalate (PETG), polybutylene terephthalate (PBT), polyvinyl chloride (PVC), polyolefin, cycloolefin copolymer (COC), acrylonitrile-butadiene-styrene (ABS) or a mixture (blend) of different thermoplastics.

The inventive composite molding has an elongation on commencement of crack formation in the layer of the polymer mixture composed of the impact-modified poly(meth)acrylate polymer and the fluoropolymer of at least 100%, preferably 120%, more preferably 150% as supplied, and, after storage at 60° C. for 10 days, of at least 50%, preferably at least 60%, in particular at least 70% of this value.

The inventive composite molding can be produced in a manner known per se by means of film lamination, coextrusion, extrusion coating, insert molding processes or solvent casting processes.

The inventive composite molding may be used, for example, as a roofing element, facade element, parts of household appliances, communication equipment, hobby or sport equipment, chassis parts or parts of chassis parts or for parts in automobile, ship or aircraft building, for example panels, bumpers, mud fenders, sun visors or trim.

Films and Their Production

Films can be produced from the inventive polymer mixture in a manner known per se by extrusion. Suitable processes are, for example, those according to DE 102 36 045 A1 or according to WO 00/37237. First, a mixture of the impact-modified poly(meth)acrylate and of the fluoropolymer is prepared.

In general, the fluoropolymers, the impact-modified poly(meth)acrylates are commercially available.

Particularly preferred mixtures contain from 30 to 95% by weight, preferably from 40 to 80% by weight, more preferably from 50 to 70% by weight of fluoropolymers, preferably polyvinylidene fluoride (PVDF), and from 70 to 5% by weight, preferably from 60 to 20% by weight and more preferably from 50 to 30% by weight of impact-modified poly(meth)acrylate, these values being based on the overall mixture. The preferred PVDF may be used as a homopolymer and/or copolymer.

The extrudable polymer mixtures may optionally contain small amounts, for example from 0 to 20%, preferably from 0 to 10% or from 0 to 5% by weight of further polymers which are miscible both with the fluoropolymers and with the impact-modified poly(meth)acrylate. These include polycarbonates, polyesters, polyamides, polyimides, polyurethanes and polyethers. The films more preferably consist predominantly, to an extent of from 98 to 100% by weight or exclusively, of impact-modified poly(meth)acrylate and fluoropolymers.

Miscibility of the different substances means that the components form a homogeneous mixture which has no opacity attributable to phase separation.

In addition, the films may comprise additives widely known in the technical field. These include antistats, antioxidants, dyes, flame retardants, fillers, light stabilizers and organic phosphorus compounds such as phosphites or phosphonates, pigments, weathering stabilizers and plasticizers.

According to the invention, all known light stabilizers, especially UV absorbers, may be used. Particular preference is given to UV absorbers of the benzotriazole and hydroxyphenyltriazine type.

Very particular preference is given to UV absorbers based on triazine. These UV absorbers have a particularly long life and are particularly weathering stable. In addition, they have excellent absorption characteristics.

In the process for producing films, preference is given to first preparing a dry mixture which comprises at least one impact-modified poly(meth)acrylate and one fluoropolymer.

In the context of the invention, dry mixing means that no solvents need be removed from this mixture in the course of the further process. Solvent residues which require no further workup or can be separated from the mixture by reduced pressure in the extruder are allowed. The mixing can be effected in conventional apparatus widely known for this purpose. The temperature at which the mixing is effected is below the gel temperature of the mixture. This step is preferably carried out at room temperature.

This mixture may, for example, be extruded on a roller which has a temperature lower than 40° C. to form a film. The extrusion of polymers to films is widely known and is described, for example, in Kunststoffextrusionstechnik II, Hanser Verlag, 1986, p. 125 ff. The hotmelt from the die of an extruder is placed onto a simple chill roll. These chill rolls are widely known in the technical field, polished rolls being used to obtain high shine. In the process according to the invention, it is also possible to use rollers other than chill rolls. A further roller first takes up the melt cooled on the first roller (chill roll) to obtain a single-layer film which may be provided with further layers.

In order that the resulting film is substantially free of impurities, a filter is arranged upstream of the entrance of the melt into the die. The mesh width of the filter is guided generally by the starting materials used and can accordingly be varied within wide ranges. In general, it is, though, within the range from 300 µm to 20 µm. It is also possible to arrange filters with a plurality of sieves of different mesh width upstream of the die entrance. These filters are widely known in the technical field and commercially available. The examples adduced may serve as a further indication for the person skilled in the art.

In order to obtain films with high quality, it is additionally advantageous to use particularly pure raw materials.

PVDF increasingly forms gels at temperatures above approx. 240° C. (manufacturer data from Solvay). These gel particles can be removed by filtration only with relative difficulty. Accordingly, it is necessary to avoid possible gel formation. Therefore, extrusion is effected at temperatures which are as far as possible below the gel temperature. For the production of films low in gel bodies, pulverulent PVDF supply forms are also possible, whose mean particle size is, for example, 0.2 mm. These are decomposed more completely in the shear field of the extruder.

However, the temperature should be high enough that the mixture can be extruded to give a film which has excellent surface quality and minimum opacity. The optimal temperature is dependent, for example, upon the composition of the mixture and can therefore vary within wide ranges. However, preferred temperatures of the mixture up to the die entrance are in the range from 150 to 210° C., more preferably in the range from 180 to 200° C. In this case, the temperature of the mixture must be kept below the gel temperature over the entire shaping process.

The pressure with which the molten mixture is pressed into the die can, for example, be controlled via the speed of the screw. The pressure is generally in a range of from 40 to 100 bar without this imposing any restriction on the process according to the invention. The speed with which the films can be obtained in accordance with the invention is accordingly greater than 5 m/min, in particular greater than 10 m/min, without any intention that this should impose a restriction on the process according to the invention. Further information regarding the general process parameters can be found by the person skilled in the art from the examples adduced.

In order that the resulting film has high surface quality and low opacity, it is essential that the temperature of the die is selected so as to be higher than the temperature of the mixture upstream of the die entrance but lower than the gel temperature.

The die temperature is preferably set from 5 to 20%, more preferably from 10 to 20% and most preferably from 12 to 18% higher than the temperature of the mixture upstream of the die entrance. Accordingly, preferred temperatures of the die are in the range from 160° C. to 235° C., more preferably from 200° C. to 230° C. and most preferably from 210° C. to 220° C.

Once the film has been obtained, it can be laminated with further films. These films may serve to protect the PVDF/imPMMA-containing layer. In addition, this may facilitate further processing of the films, since these polymer films may have a particularly high adhesive strength to resins which are sprayed over or onto the films in subsequent processes.

These layers which can be applied to protect or to improve the adhesive strength onto the PVDF/imPMMA-containing layer are more preferably, inter alia, of polyesters such as polybutylene terephthalate (PBT), polyethylene terephthalate (PET) and polyolefins such as polyvinyl chloride (PVC), polypropylene (PP), polyethylene (PE), acrylonitrile-butadiene-styrene copolymers (ABS), ABS/ASA blends (ASA =acrylonitrile-styrene-acrylic ester copolymers), polycarbonates and polyamides, and mixtures of these polymers.

The PVDF/imPMMA-containing films may also be provided with pigments or printed with dyes. It is also possible to achieve metallic effects on these films. These processes are known to those skilled in the art and are referred to, for example, as gravure printing, gravure coating and microgravure coating.

It is possible in turn for further layers which serve to improve the adhesion of polymer applied subsequently to be applied to this layer provided with decoration or other adornments.

The application of these layers by colamination can be effected at room temperature or at slightly elevated temperature, so that the surface quality and the opacity of the PVDF/PMMA-containing layer are not impaired. These processes are widely known in the technical field and are described, for example, in Kunststoffextrusionstechnik II, Hanser Verlag, 1986, p. 320 ff.

It is particularly advantageous that the aforementioned steps, i.e. the production of the PVDF/PMMA-containing film, the printing and the lamination with further layers can generally be carried out in a continuous process.

However, the process of the present invention shall not be restricted to colamination with further films. Instead, these layers may also be applied by solvent coating (solvent casting) or by extrusion coating (extrusion casting), as described, for example, in the patent application WO 96/40480 and WO 88/07416 and in the U.S. Pat. No. 4,902,557.

It is obvious to the person skilled in the art that these layers can be added to multilayer films in various arrangements. One such film may accordingly have a plurality of decorative layers/printed layers in different sequence. In addition, multilayer films may also comprise adhesive layers which may serve either to bind layers of different polymers or to secure the films to the objects to be protected.

Properties of the Film

The inventive film may have a thickness of from 150 to 2000 µm, preferably from 200 to 1500 µm, more preferably from 400 to 1000 µm.

Determination of Elongation at Break

The value of the elongation at break with or without thermal stress, which is particularly important for the characterization of the properties, can be determined by the following method.

The determination of elongation at break is done at 23° C. and 50% relative humidity according to ISO 527/3/2/100 in the case of thicknesses up to 100 µm or according to ISO 527/1B/50 in the case of thicknesses above 100 µm. In both cases, the rate of elongation is thus 100%/min. The elongation at break of the material is determined as supplied and after storage for 10 days in a heating cabinet, typically at 60° C. The smaller the ratio of elongation at break after heat storage divided by elongation at break as supplied, the greater the extent to which the heat storage has led to embrittlement.

The elongation at break of the films which have just been extruded in the state as supplied in the case of film thicknesses of at least 150 µm, for example from at least 200 to 2000 µm, is in the range from 200 to 300%.

After storage at 60° C. for 10 days, the elongation at break is still at least 150%, preferably at least 180%, more preferably at least 200%, in particular at least 250%.

In the case of film thicknesses in the region of more than 150 µm up to, for example, 2000 µm or more, preferably from 200 to 750 µm, the elongation at break of the film after storage at 60° C. for 10 days is still at least 60%, preferably at least 70% of the value without thermal stress at 60° C. for 10 days.

In the case of noninventive mixture fractions of impact-modified poly(meth)acrylate and fluoropolymers outside the range of from 30 to 95% by weight of fluoropolymers, for example in the case of fractions of fluoropolymers of 25 or less more than 95% by weight or higher, the values of elongation at break of the film after storage at 60° C. for 10 days surprisingly decline relatively sharply when the parts have a material thickness of at least 150 μm. Noticeable and undesired embrittlement occurs, which is disadvantageously noticeable especially in the case of exterior applications and simultaneous thermal exposure, for example in relatively warm geographical regions.

Properties of the Composite Body

A composite molding has, in addition to the layer comprising the polymer mixture composed of the impact-modified poly(meth)acrylate polymer and the fluoropolymer, a further thermoplastically processible polymer bonded to the polymer mixture, the layer of the polymer mixture having a continuous material thickness of from 10 to 100 μm, in particular of 30-90 μm. The composite molding may have any layer thickness or material thickness of at least 150 μm, for example 200-5000 μm.

The value of elongation on commencement of crack formation in the layer of the polymer mixture composed of the impact-modified poly(meth)acrylate polymer and the fluoropolymer, which is particularly important for the characterization of the properties, can then be determined by the following method. The material selected for the substrate for this test method is preferably a polymer whose elongation at break is higher than the elongation on commencement of crack formation in the top layer; suitable materials are, for example, polyethylene terephthalate, LD or HD polyethylene.

The determination of elongation on commencement of crack formation is done at 23° C. and 50% relative humidity in a tensile test according to ISO 527/1B/50. During the tensile test, the layer of the polymer mixture has to be illuminated in a suitable manner, so that the occurrence of cracks in the top layer can be detected visually by eye. The current elongation on occurrence of the first cracks in the top layer is noted. The tensile test is carried out with 5 specimens. Suitable specimens are of total thickness from 1 mm to 2 mm. The mean of the elongation on commencement of crack formation is then reported as the result.

The elongation on commencement of crack formation is determined as supplied and after storage in a heating cabinet for 10 days, typically at 60° C. The smaller the ratio of
   elongation on commencement of crack formation after heat storage divided by elongation on commencement of crack formation as supplied,
the greater the extent to which the heat storage has led to embrittlement of the top layer.

EXAMPLES

Films of different thickness were produced by extrusion.
The starting materials used were:
Impact-modified poly(meth)acrylate (imPMMA): An impact-modified poly(meth)acrylate polymer composed of 33% by weight of a poly(meth)acrylate matrix and 67% by weight of elastomer particles with a mean particle diameter of 60 nm. The elastomer particles distributed in the poly(meth)acrylate matrix have a core with a soft elastomer phase and a hard phase bonded thereto.

Polyvinylidene fluoride (PVDF) PVDF KT 1000 is VDF homopolymer; manufacturer: Kureha Chemicals, Japan The polymers were dry-mixed and extruded to films.
Determination of the Elastomer Particle Content Material to be investigated is comminuted (granules may be used directly), and an amount of from approx. 1 to 2 g is weighed precisely with an analytical balance (precision 0.1 mg) into a 150 ml beaker. The sample is dissolved with stirring (magnetic stirrer) at about 50° C. in approx. 80 ml of acetone, significant opacity occurring as a result of the insoluble elastomer phase.

The cloudy polymer solution thus obtained is divided on a laboratory balance (precision 0.1 g) quantitatively into 4 centrifuge cups (steel, each 30-50 ml), so that their end weights differ from one another by a maximum of 0.1 g. These are introduced into the rotor of the centrifuge (with cooling, at least 35 000 g) and centrifuged at approx. 21 000 rpm (relative centrifugal acceleration approx. 41 000) for at least 30 minutes.

The now clear supernatant solutions in the beakers are decanted off, concentrated in a preweighed bottle and dried to constant mass in a drying cabinet under reduced pressure (=acetone-soluble fraction).

The sediments are likewise weighed quantitatively into a weighing bottle and dried to constant mass in the same way (=acetone-insoluble fraction).

The mass fractions are calculated from the weighings:

a) $\text{acetone-soluble fraction } [\%] = \frac{\text{final weight } [g] \cdot 100\%}{\text{starting weight } [g]}$ b) $\text{acetone-insoluble fraction } [\%] = \frac{\text{final weight (sediments) } [g] \cdot 100\%}{\text{starting weight } [g]}$ Depending on the type of fluoropolymers present in the molding, two cases can be distinguished for further evaluation, which can be distinguished, for example, by a couple of simple preliminary experiments (solubility tests) or by elemental analysis of the acetone-insoluble fraction (fluorine determination):

1) Fluoropolymer is Fully Soluble in Acetone

The acetone-insoluble fraction thus determined corresponds to the elastomer particle content and is based on the entire molding. For the person skilled in the art in the field, it is possible without any problems, if appropriate, to determine the fraction of the fluoropolymer in the molding, for example by elemental analysis in combination with spectroscopic methods and/or the Zeisel alkoxy determination, and then to base the elastomer particle content on the fraction of impact-modified poly(meth)acrylate polymer.

2. Fluoropolymer is Insoluble or is not Fully Soluble in Acetone:

The determination can optionally be carried out in a different solvent other than acetone, in which the fluoropolymer dissolves completely.

If it is not possible to find a solvent in which the fluoropolymer dissolves completely, the acetone-insoluble fraction thus determined is a mixture of the elastomer particles and insoluble fluoropolymer and is based on the entire molding. For the person skilled in the art in the field, it is likewise possible without any problems to determine the fraction of elastomer particles in the acetone-insoluble fraction (sediment), for example by determining the fraction of the fluoropolymer by elemental analysis in combination with spectroscopic methods and/or Zeisel alkoxy determination, and then to base the elastomer particle content on the fraction of the impact-modified poly(meth)acrylate polymer.

| Ex. | Fractions [% by weight] PMMA [%] | PVDF [%] | Film thickness [μm] | Elastomer particle content of the PMMA fraction [%] | Elongation at break without thermal stress [%] | Elongation at break after 10 days at 60° C. [%] | Ratio of after/without thermal stress [%] |
| --- | --- | --- | --- | --- | --- | --- | --- |
| A | 30 | 70 | 500 | 65 | 262 | 177 | 68 |
| A-Comp. | 30 | 70 | 500 | 0 | 293 | 14 | 5 |
| B | 30 | 70 | 250 | 65 | 299 | 292 | 98 |
| B-Comp. | 30 | 70 | 250 | 0 | 442 | 7 | 2 |
| C-Comp. | 30 | 70 | 50 | 65 | 355 | 305 | 86 |
| D-Comp. | 30 | 70 | 50 | 0 | 393 | 321 | 82 |
| E | 40 | 60 | 200 | 60 | 273 | 205 | 75 |
| F | 40 | 60 | 200 | 40 | 357 | 292 | 82 |
| G-Comp. | 40 | 60 | 200 | 20 | 331 | 9 | 3 |

Comp. = comparative example
"PMMA" means standard PMMA or impact-modified PMMA

What is claimed is:

1. A molding having a material thickness of at least 150 μm, and obtained from a composition comprising a polymer mixture comprising (1) an impact-modified poly(meth)acrylate polymer which is a poly(meth)acrylate matrix with elastomer particles distributed therein, and (2) a fluoropolymer, the proportion of the fluoropolymer in the polymer mixture being from 30 to 95% by weight, wherein
the impact-modified poly(meth)acrylate polymer consists of from 20 to 70% by weight of the poly(meth)acrylate matrix and from 80 to 30% by weight of the elastomer particles.

2. The molding as claimed in claim 1, wherein the elastomer particles have a core of a soft elastomer phase and a hard phase bonded thereto.

3. The molding as claimed in claim 1, wherein the mean particle diameter of the elastomer particles is from 10 to 1000 nm.

4. The molding as claimed in claim 1, wherein said composition consists entirely of said polymer mixture.

5. The molding as claimed in claim 4, wherein the material thickness is from 150 to 10 000 μm.

6. The molding as claimed in claim 5, wherein the elongation at break after storage at 60° C. for 10 days is at least 150%.

7. The molding as claimed in claim 5, wherein the elongation at break after storage at 60° C. for 10 days is still at least 60% of the value without 10-day thermal stress.

8. The molding as claimed in claim 5, which is in the form of a film, and wherein the film is present within a membrane structure, said membrane structure comprising at least two curved films welded to one another at the edges and enclosing a cavity.

9. A process for producing the molding as claimed in claim 5, comprising thermoplastic processing, extrusion or injection molding, or solvent casting said composition.

10. A method comprising forming the molding as claimed in claim 5 as a roofing element, façade element, or a window in a folding roof for a vehicle with foldable soft top.

11. The molding as claimed in claim 1, wherein from 0.01 to 10% by weight of a light stabilizer is present therein.

12. The molding as claimed in claim 1, wherein the proportion of the fluoropolymer in the polymer mixture is from 50 to 70% by weight.

13. The molding as claimed in claim 1, wherein the elastomer particles are present in an amount of 70 to 50% by weight of the impact-modified poly(meth)acrylate polymer.

* * * * *